United States Patent
Louie et al.

(10) Patent No.: US 12,093,447 B2
(45) Date of Patent: Sep. 17, 2024

(54) EPHEMERAL ARTIFICIAL REALITY EXPERIENCES

(71) Applicant: META PLATFORMS TECHNOLOGIES, LLC, Menlo Park, CA (US)

(72) Inventors: Alexander Michael Louie, Milpitas, CA (US); Bernhard Poess, Redmond, WA (US); Jossie E. Tirado Arroyo, Kenmore, WA (US); Michal Hlavac, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/575,297

(22) Filed: Jan. 13, 2022

(65) Prior Publication Data
US 2023/0221797 A1  Jul. 13, 2023

(51) Int. Cl.
*G06F 3/01* (2006.01)
*G06F 8/61* (2018.01)
*G06F 21/62* (2013.01)

(52) U.S. Cl.
CPC .............. *G06F 3/013* (2013.01); *G06F 8/61* (2013.01); *G06F 21/629* (2013.01)

(58) Field of Classification Search
CPC ........... G06F 3/013; G06F 8/61; G06F 21/629
See application file for complete search history.

(56) References Cited

U.S. PATENT DOCUMENTS

| 770,149 A | 9/1904 | Bailey |
| 6,842,175 B1 | 1/2005 | Schmalstieg et al. |

(Continued)

FOREIGN PATENT DOCUMENTS

| EP | 2887322 B1 | 2/2020 |
| JP | 2019101743 A | 6/2019 |

(Continued)

OTHER PUBLICATIONS

"App Clips," Apple Developer, 2022, 4 pages, Retrieved from the Internet: URL: https://developer.apple.com/app-clips/.

(Continued)

*Primary Examiner* — Amare Mengistu
*Assistant Examiner* — Jennifer L Zubajlo
(74) *Attorney, Agent, or Firm* — Potomac Law Group PLLC; Dannon G. Allbee

(57) ABSTRACT

In one embodiment, a method includes instructing sensors on an AR headset to capture data of a real-world environment, discovering a 3D location where a native application configured to run natively on an operating system is downloadable, generating and displaying a virtual object representing the native application at the 3D location, detecting a user of the AR system interacting with the virtual object, downloading a first executable portion of the native application, executing the first executable portion within a sandbox process having a predetermined set of access permissions, progressively downloading a remaining executable portion of the native application while the user is interacting with the executed first executable portion, and in response to a determination that the native application is completely downloaded, installing the native application on the operating system.

20 Claims, 9 Drawing Sheets

(56) References Cited

U.S. PATENT DOCUMENTS

| | | | |
|---|---|---|---|
| 7,395,534 B2* | 7/2008 | Alcazar | G06F 8/61 |
| | | | 717/176 |
| 7,650,575 B2 | 1/2010 | Cummins et al. | |
| 7,701,439 B2 | 4/2010 | Hillis et al. | |
| 8,335,991 B2 | 12/2012 | Douceur et al. | |
| 8,558,759 B1 | 10/2013 | Prada Gomez et al. | |
| 8,726,233 B1 | 5/2014 | Raghavan | |
| 8,930,940 B2* | 1/2015 | Xu | G06F 8/61 |
| | | | 717/178 |
| 8,947,351 B1 | 2/2015 | Noble | |
| 8,947,427 B2 | 2/2015 | Shuster et al. | |
| 9,055,404 B2 | 6/2015 | Setlur et al. | |
| 9,081,177 B2 | 7/2015 | Wong et al. | |
| 9,117,274 B2 | 8/2015 | Liao et al. | |
| 9,129,404 B1 | 9/2015 | Wagner | |
| 9,292,089 B1 | 3/2016 | Sadek | |
| 9,443,353 B2 | 9/2016 | Vaddadi et al. | |
| 9,477,368 B1 | 10/2016 | Filip et al. | |
| 9,478,030 B1 | 10/2016 | Lecky | |
| 9,530,252 B2 | 12/2016 | Poulos et al. | |
| 9,607,422 B1 | 3/2017 | Leedom | |
| 9,658,737 B2 | 5/2017 | Rothenberger et al. | |
| 9,817,472 B2 | 11/2017 | Lee et al. | |
| 9,870,716 B1* | 1/2018 | Rao | H04N 21/2353 |
| 9,922,462 B2 | 3/2018 | Miller | |
| 10,013,625 B1* | 7/2018 | Ahammad | G06T 7/0002 |
| 10,015,503 B1* | 7/2018 | Ahammad | H04L 67/04 |
| 10,220,303 B1 | 3/2019 | Schmidt et al. | |
| 10,248,284 B2 | 4/2019 | Itani et al. | |
| 10,319,154 B1 | 6/2019 | Chakravarthula et al. | |
| 10,335,572 B1 | 7/2019 | Kumar | |
| 10,473,935 B1 | 11/2019 | Gribetz et al. | |
| 10,521,944 B2 | 12/2019 | Sareen et al. | |
| 10,551,993 B1 | 2/2020 | Sanocki et al. | |
| 10,715,851 B1 | 7/2020 | Shankar et al. | |
| 10,783,714 B2 | 9/2020 | Diament et al. | |
| 10,799,792 B2 | 10/2020 | Rios | |
| 10,803,663 B2 | 10/2020 | Wang et al. | |
| 10,902,679 B2 | 1/2021 | Molyneaux et al. | |
| 10,909,762 B2 | 2/2021 | Karalis et al. | |
| 10,950,034 B1 | 3/2021 | Garcia et al. | |
| 10,963,144 B2 | 3/2021 | Fox et al. | |
| 10,996,915 B2 | 5/2021 | Kim | |
| 11,009,716 B2 | 5/2021 | Kiemele et al. | |
| 11,017,609 B1 | 5/2021 | Buzzerio et al. | |
| 11,064,047 B1* | 7/2021 | Stegall | G06F 8/61 |
| 11,068,393 B2* | 7/2021 | Mandaleeka | G06F 9/4484 |
| 11,100,812 B2 | 8/2021 | Daniel et al. | |
| 11,113,893 B1 | 9/2021 | Ma et al. | |
| 11,126,320 B1 | 9/2021 | Thompson et al. | |
| 11,170,576 B2 | 11/2021 | Ravasz et al. | |
| 11,176,755 B1 | 11/2021 | Tichenor et al. | |
| 11,178,376 B1 | 11/2021 | Tichenor et al. | |
| 11,216,152 B2 | 1/2022 | Alexander | |
| 11,227,445 B1 | 1/2022 | Tichenor et al. | |
| 11,238,664 B1 | 2/2022 | Tavakoli et al. | |
| 11,270,513 B2* | 3/2022 | Yerli | G06T 19/006 |
| 11,270,522 B1 | 3/2022 | Tauber et al. | |
| 11,307,647 B2 | 4/2022 | Bond et al. | |
| 11,409,405 B1 | 8/2022 | Hlavac et al. | |
| 11,417,054 B1 | 8/2022 | Tanner et al. | |
| 11,433,304 B2 | 9/2022 | Fish et al. | |
| 11,521,361 B1 | 12/2022 | Taguchi et al. | |
| 11,593,997 B2 | 2/2023 | Smith et al. | |
| 11,636,655 B2 | 4/2023 | Ma et al. | |
| 11,651,573 B2 | 5/2023 | Tichenor et al. | |
| 11,676,348 B2 | 6/2023 | Simpson et al. | |
| 11,720,167 B2 | 8/2023 | Bond et al. | |
| 11,748,944 B2 | 9/2023 | Karadayi et al. | |
| 11,762,952 B2 | 9/2023 | Hlavac et al. | |
| 11,769,304 B2 | 9/2023 | Tichenor et al. | |
| 11,798,247 B2 | 10/2023 | Karadayi et al. | |
| 11,847,753 B2 | 12/2023 | Tichenor et al. | |
| 11,928,308 B2 | 3/2024 | Hlavac et al. | |
| 11,935,208 B2 | 3/2024 | Karadayi et al. | |
| 2003/0038805 A1 | 2/2003 | Wong et al. | |
| 2003/0106063 A1* | 6/2003 | Guedalia | H04N 21/4331 |
| | | | 348/E7.071 |
| 2004/0237082 A1* | 11/2004 | Alcazar | G06F 8/61 |
| | | | 717/174 |
| 2005/0018216 A1* | 1/2005 | Barsness | G06Q 30/02 |
| | | | 358/1.14 |
| 2008/0089587 A1 | 4/2008 | Kim et al. | |
| 2008/0092111 A1 | 4/2008 | Kinnucan et al. | |
| 2009/0006937 A1* | 1/2009 | Knapp | G06Q 30/0204 |
| | | | 705/7.33 |
| 2009/0307623 A1 | 12/2009 | Agarawala et al. | |
| 2009/0313299 A1 | 12/2009 | Bonev et al. | |
| 2010/0251177 A1 | 9/2010 | Geppert et al. | |
| 2010/0306716 A1 | 12/2010 | Perez | |
| 2011/0185043 A1* | 7/2011 | Zeller | H04L 67/10 |
| | | | 709/227 |
| 2011/0267265 A1 | 11/2011 | Stinson | |
| 2012/0069168 A1 | 3/2012 | Huang et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0218301 A1* | 8/2012 | Miller | G06Q 30/02 |
| | | | 345/633 |
| 2012/0249741 A1 | 10/2012 | Maciocci et al. | |
| 2012/0275686 A1 | 11/2012 | Wilson et al. | |
| 2012/0293544 A1 | 11/2012 | Miyamoto et al. | |
| 2013/0051615 A1 | 2/2013 | Lim et al. | |
| 2013/0063345 A1 | 3/2013 | Maeda | |
| 2013/0069860 A1 | 3/2013 | Davidson | |
| 2013/0076788 A1* | 3/2013 | Ben Zvi | G06F 16/5854 |
| | | | 345/633 |
| 2013/0083173 A1* | 4/2013 | Geisner | G06T 19/006 |
| | | | 348/51 |
| 2013/0117688 A1 | 5/2013 | Yerli | |
| 2013/0125066 A1 | 5/2013 | Klein et al. | |
| 2013/0147793 A1 | 6/2013 | Jeon et al. | |
| 2013/0169682 A1 | 7/2013 | Novak et al. | |
| 2013/0265220 A1 | 10/2013 | Fleischmann et al. | |
| 2013/0293468 A1 | 11/2013 | Perez et al. | |
| 2013/0336528 A1 | 12/2013 | Mulholland et al. | |
| 2014/0075370 A1 | 3/2014 | Guerin et al. | |
| 2014/0114845 A1* | 4/2014 | Rogers | G06T 19/006 |
| | | | 345/419 |
| 2014/0125598 A1 | 5/2014 | Cheng et al. | |
| 2014/0149901 A1 | 5/2014 | Hunter | |
| 2014/0225922 A1 | 8/2014 | Sbardella | |
| 2014/0236996 A1 | 8/2014 | Masuko et al. | |
| 2014/0270494 A1 | 9/2014 | Sawhney et al. | |
| 2014/0357366 A1 | 12/2014 | Koganezawa et al. | |
| 2014/0375683 A1 | 12/2014 | Salter et al. | |
| 2014/0375691 A1 | 12/2014 | Kasahara | |
| 2015/0015504 A1 | 1/2015 | Lee et al. | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0077592 A1 | 3/2015 | Fahey | |
| 2015/0123966 A1* | 5/2015 | Newman | G06T 19/006 |
| | | | 345/419 |
| 2015/0143302 A1 | 5/2015 | Chang et al. | |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0253862 A1 | 9/2015 | Seo et al. | |
| 2015/0261659 A1 | 9/2015 | Bader et al. | |
| 2015/0269780 A1 | 9/2015 | Herman et al. | |
| 2015/0356774 A1 | 12/2015 | Gal et al. | |
| 2016/0026253 A1 | 1/2016 | Bradski et al. | |
| 2016/0063762 A1 | 3/2016 | Heuvel et al. | |
| 2016/0110052 A1 | 4/2016 | Kim et al. | |
| 2016/0133170 A1 | 5/2016 | Fateh | |
| 2016/0147308 A1 | 5/2016 | Gelman et al. | |
| 2016/0147408 A1 | 5/2016 | Bevis et al. | |
| 2016/0170603 A1 | 6/2016 | Bastien et al. | |
| 2016/0180590 A1 | 6/2016 | Kamhi et al. | |

(56) References Cited

U.S. PATENT DOCUMENTS

| | | |
|---|---|---|
| 2016/0189386 A1 | 6/2016 | Michaelraj et al. |
| 2016/0260261 A1 | 9/2016 | Hsu |
| 2016/0378291 A1 | 12/2016 | Pokrzywka |
| 2017/0060230 A1 | 3/2017 | Faaborg et al. |
| 2017/0069134 A1 | 3/2017 | Shapira et al. |
| 2017/0075420 A1 | 3/2017 | Yu et al. |
| 2017/0076500 A1 | 3/2017 | Maggiore et al. |
| 2017/0084051 A1 | 3/2017 | Weising et al. |
| 2017/0099295 A1* | 4/2017 | Ricci ............... G08G 1/096725 |
| 2017/0109936 A1 | 4/2017 | Powderly et al. |
| 2017/0124230 A1* | 5/2017 | Liu ........................ G06F 17/16 |
| 2017/0139478 A1 | 5/2017 | Jeon et al. |
| 2017/0192513 A1 | 7/2017 | Karmon et al. |
| 2017/0237789 A1 | 8/2017 | Harner et al. |
| 2017/0242675 A1 | 8/2017 | Deshmukh |
| 2017/0243465 A1 | 8/2017 | Bourne, Jr. et al. |
| 2017/0258526 A1 | 9/2017 | Lang |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0059901 A1 | 3/2018 | Gullicksen |
| 2018/0082480 A1 | 3/2018 | White et al. |
| 2018/0095616 A1 | 4/2018 | Valdivia et al. |
| 2018/0095635 A1* | 4/2018 | Valdivia ............. G02B 27/0093 |
| 2018/0095636 A1* | 4/2018 | Valdivia .................. G06F 3/011 |
| 2018/0096507 A1* | 4/2018 | Valdivia ............. G06F 3/04842 |
| 2018/0096519 A1 | 4/2018 | Tokubo |
| 2018/0098059 A1* | 4/2018 | Valdivia .................. G06F 3/011 |
| 2018/0107278 A1 | 4/2018 | Goel et al. |
| 2018/0113599 A1 | 4/2018 | Yin |
| 2018/0158134 A1* | 6/2018 | Hassan ................. G06F 16/955 |
| 2018/0189568 A1 | 7/2018 | Powderly et al. |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0314484 A1 | 11/2018 | Pahud et al. |
| 2018/0315162 A1 | 11/2018 | Sturm et al. |
| 2018/0322701 A1 | 11/2018 | Pahud et al. |
| 2018/0323972 A1* | 11/2018 | Reed ................... H04W 12/068 |
| 2018/0335925 A1 | 11/2018 | Hsiao et al. |
| 2018/0350144 A1 | 12/2018 | Rathod |
| 2018/0357780 A1 | 12/2018 | Young et al. |
| 2018/0365897 A1 | 12/2018 | Pahud et al. |
| 2019/0005724 A1 | 1/2019 | Pahud et al. |
| 2019/0018498 A1 | 1/2019 | West et al. |
| 2019/0094981 A1 | 3/2019 | Bradski et al. |
| 2019/0096131 A1 | 3/2019 | Crews et al. |
| 2019/0107894 A1 | 4/2019 | Hebbalaguppe et al. |
| 2019/0108682 A1 | 4/2019 | Spivack et al. |
| 2019/0114061 A1 | 4/2019 | Daniels et al. |
| 2019/0130656 A1 | 5/2019 | Gebbie et al. |
| 2019/0130788 A1 | 5/2019 | Seaton |
| 2019/0155481 A1 | 5/2019 | DiVerdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0221035 A1 | 7/2019 | Clark et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0278432 A1 | 9/2019 | Bennett et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0294721 A1 | 9/2019 | Keifer et al. |
| 2019/0294889 A1 | 9/2019 | Sriram et al. |
| 2019/0340799 A1 | 11/2019 | Dryer et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0371060 A1 | 12/2019 | Energin et al. |
| 2019/0371279 A1 | 12/2019 | Mak |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0385371 A1 | 12/2019 | Joyce et al. |
| 2020/0013211 A1 | 1/2020 | Bergen et al. |
| 2020/0042108 A1 | 2/2020 | Wan |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0111256 A1 | 4/2020 | Bleyer et al. |
| 2020/0151965 A1 | 5/2020 | Forbes et al. |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0226823 A1 | 7/2020 | Stachniak et al. |
| 2020/0241300 A1 | 7/2020 | Robinson et al. |
| 2020/0242842 A1 | 7/2020 | Fukazawa et al. |
| 2020/0279386 A1 | 9/2020 | Da Veiga |
| 2020/0279429 A1 | 9/2020 | Upadhyay et al. |
| 2020/0285761 A1 | 9/2020 | Buck et al. |
| 2020/0289934 A1 | 9/2020 | Azmandian et al. |
| 2020/0312028 A1 | 10/2020 | Charvat et al. |
| 2020/0334908 A1 | 10/2020 | Wilson et al. |
| 2020/0342673 A1 | 10/2020 | Lohr et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2020/0368616 A1 | 11/2020 | Delamont |
| 2020/0375666 A1 | 12/2020 | Murphy |
| 2020/0394935 A1 | 12/2020 | Ray et al. |
| 2020/0402320 A1 | 12/2020 | Crews et al. |
| 2021/0012113 A1 | 1/2021 | Petill et al. |
| 2021/0014408 A1 | 1/2021 | Timonen et al. |
| 2021/0096726 A1* | 4/2021 | Faulkner ................... G06T 7/70 |
| 2021/0097768 A1 | 4/2021 | Malia et al. |
| 2021/0111890 A1* | 4/2021 | Reed ........................ G06F 3/013 |
| 2021/0125414 A1 | 4/2021 | Berkebile |
| 2021/0158608 A1 | 5/2021 | Boggs et al. |
| 2021/0183114 A1 | 6/2021 | Corson |
| 2021/0191600 A1 | 6/2021 | Lemay et al. |
| 2021/0192856 A1 | 6/2021 | Lee |
| 2021/0272375 A1 | 9/2021 | Lashmar et al. |
| 2021/0295602 A1 | 9/2021 | Scapel et al. |
| 2021/0306238 A1 | 9/2021 | Cheng et al. |
| 2021/0322856 A1 | 10/2021 | Virkar et al. |
| 2021/0390765 A1 | 12/2021 | Laaksonen et al. |
| 2022/0038522 A1* | 2/2022 | Goolkasian .......... G06Q 20/204 |
| 2022/0068035 A1 | 3/2022 | Tichenor et al. |
| 2022/0084279 A1 | 3/2022 | Lindmeier et al. |
| 2022/0091722 A1 | 3/2022 | Faulkner et al. |
| 2022/0100265 A1 | 3/2022 | Kies et al. |
| 2022/0100279 A1 | 3/2022 | Lee et al. |
| 2022/0101612 A1 | 3/2022 | Palangie et al. |
| 2022/0121344 A1 | 4/2022 | Pastrana Vicente et al. |
| 2022/0139052 A1 | 5/2022 | Tavakoli et al. |
| 2022/0161422 A1 | 5/2022 | Chen et al. |
| 2022/0211188 A1* | 7/2022 | Daub ...................... G06Q 10/08 |
| 2022/0261088 A1 | 8/2022 | Pinchon et al. |
| 2022/0276765 A1 | 9/2022 | Hlavac et al. |
| 2022/0358715 A1 | 11/2022 | Tanner et al. |
| 2022/0406021 A1 | 12/2022 | LeBeau et al. |
| 2022/0414403 A1* | 12/2022 | Hlavac ................ G06F 18/2415 |
| 2023/0022194 A1 | 1/2023 | Soryal |
| 2023/0056976 A1 | 2/2023 | Tanner et al. |
| 2023/0126837 A1 | 4/2023 | Karadayi et al. |
| 2023/0127438 A1 | 4/2023 | Karadayi et al. |
| 2023/0134355 A1 | 5/2023 | Lansel et al. |
| 2023/0152851 A1 | 5/2023 | Berliner et al. |
| 2023/0169737 A1 | 6/2023 | Taguchi et al. |
| 2023/0196766 A1 | 6/2023 | Pla, I et al. |

(56) References Cited

U.S. PATENT DOCUMENTS

| | | | |
|---|---|---|---|
| 2023/0215120 | A1 | 7/2023 | Ma et al. |
| 2023/0244755 | A1 | 8/2023 | Hlavac et al. |
| 2023/0245386 | A1 | 8/2023 | Karadayi et al. |
| 2023/0260000 | A1 | 8/2023 | Belavy |
| 2023/0260233 | A1 | 8/2023 | Goncalves et al. |
| 2023/0290089 | A1 | 9/2023 | Simpson et al. |
| 2023/0367611 | A1 | 11/2023 | Blakeley et al. |
| 2023/0384859 | A1 | 11/2023 | Bond et al. |
| 2023/0410436 | A1 | 12/2023 | Beauchamp et al. |
| 2023/0419616 | A1 | 12/2023 | Dudovitch et al. |
| 2023/0419998 | A1 | 12/2023 | Nguyen et al. |
| 2024/0045495 | A1 | 2/2024 | Elhadad et al. |
| 2024/0126406 | A1 | 4/2024 | Hlavac et al. |

FOREIGN PATENT DOCUMENTS

| | | |
|---|---|---|
| JP | 2022147265 A | 10/2022 |
| WO | 2014097706 A1 | 6/2014 |
| WO | 2015192117 A1 | 12/2015 |
| WO | 2016041088 A1 | 3/2016 |
| WO | 2018235371 A1 | 12/2018 |
| WO | 2019143839 A1 | 7/2019 |
| WO | 2020159302 A1 | 8/2020 |
| WO | 2020226832 A1 | 11/2020 |
| WO | 2021163373 A1 | 8/2021 |
| WO | 2022055822 A1 | 3/2022 |

OTHER PUBLICATIONS

"Google Play Instant," Retrieved on [Jan. 27, 2022], 2 pages, Retrieved from the Internet: URL: https://developer.android.com/topic/google-play-instant.

International Search Report and Written Opinion for International Application No. PCT/US2022/054413, mailed Jul. 7, 2023, 11 pages.

Advisory Action mailed Oct. 13, 2021 for U.S. Appl. No. 16/567,563, filed Sep. 11, 2019, 3 pages.

Broitman A., "Learn and Do More with Lens in Google Images," Oct. 25, 2018, Retrieved from the Internet: URL: https://www.blog.google/products/search/learn-and-do-more-lens-google-images/ , 4 pages.

Final Office Action mailed Aug. 5, 2021 for U.S. Appl. No. 16/567,563, filed Sep. 11, 2019, 11 Pages.

Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/045538, mailed Mar. 24, 2022, 9 pages.

International Preliminary Report on Patentability for International Application No. PCT/US2021/044098, mailed Mar. 9, 2023, 18 pages.

International Preliminary Report on Patentability for International Application No. PCT/US2022/032288, mailed Jan. 11, 2024, 10 pages.

International Preliminary Report on Patentability for International Application No. PCT/US2022/033338, mailed Jan. 11, 2024, 11 pages.

International Search Report and Written Opinion for International Application No. PCT/US2020/045538, mailed Oct. 23, 2020, 11 Pages.

International Search Report and Written Opinion for International Application No. PCT/US2020/051763, mailed Feb. 3, 2021, 11 Pages.

International Search Report and Written Opinion for International Application No. PCT/US2022/020292 mailed Aug. 17, 2022, 17 pages.

International Search Report and Written Opinion for International Application No. PCT/US2022/031840, mailed Sep. 13, 2022, 13 pages.

International Search Report and Written Opinion for International Application No. PCT/US2022/032288, mailed Sep. 16, 2022, 11 pages.

International Search Report and Written Opinion for International Application No. PCT/US2022/033338 mailed Sep. 6, 2022, 13 pages.

International Search Report and Written Opinion for International Application No. PCT/US2022/040484, mailed Nov. 25, 2022, 11 pages.

International Search Report and Written Opinion for International Application No. PCT/US2022/045510, mailed Jan. 19, 2023, 10 pages.

International Search Report and Written Opinion for International Application No. PCT/US2022/053780, mailed Mar. 20, 2023, 10 pages.

International Search Report and Written Opinion for International Application No. PCT/US2023/021312, mailed Aug. 24, 2023, 15 pages.

Invitation to Pay Additional Fees for International Application No. PCT/US2021/044098, Nov. 3, 2021, 15 pages.

Mayer S., et al, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Melnick K., "Google Rolls out New AR Features for Its Lens APP," May 28, 2019, Retrieved from the Internet: URL: https://vrscout.com/news/new-ar-features-google-lens/ , 3 pages.

Non-Final Office Action mailed Dec. 8, 2022 for U.S. Appl. No. 17/659,431, filed Apr. 15, 2022, 12 pages.

Non-Final Office Action mailed Jan. 25, 2021 for U.S. Appl. No. 16/567,563, filed Sep. 11, 2019, 10 Pages.

Notice of Allowance mailed Dec. 21, 2021 for U.S. Appl. No. 16/567,563, filed Sep. 11, 2019, 6 pages.

Notice of Allowance mailed Mar. 21, 2023 for U.S. Appl. No. 17/659,431, filed Apr. 15, 2022, 5 pages.

Office Action mailed Aug. 21, 2023 for Chinese Application No. 202080054473.3, filed Aug. 8, 2020, 7 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Prosecution History of U.S. Appl. No. 16/567,563 dated Jan. 25, 2021, through Dec. 21, 2021, 52 pages.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.

Wikipedia: "Simultaneous Localization and Mapping," Jul. 25, 2017, 7 pages, Retrieved from the Internet: URL: https://en.wikipedia.org/w/index.php?title=Simultaneous_localization_and_mapping&oldid=731478358 [Retrieved on Oct. 23, 2017].

Wikipedia, "Multiple-document Interface," May 8, 2022 [retrieved on 2023-008-16], 5 pages, Retrieved from the Internet: URL: https://web.archive.org/web/20220508091934/https://en.wikipedia.org/wiki/Multipledocument_interface.

(56) References Cited

OTHER PUBLICATIONS

International Preliminary Report on Patentability for International Application No. PCT/US2022/040484, mailed Feb. 29, 2024, 9 pages.
International Preliminary Report on Patentability for International Application No. PCT/US2022/045510, mailed May 10, 2024, 9 pages.
Office Action mailed Feb. 26, 2024 for European Patent Application No. 20761419.9, filed on Aug. 8, 2020, 7 pages.
Tatzgern M., et al., "Adaptive Information Density for Augmented Reality Displays," IEEE Virtual Reality Conference, Mar. 19-23, 2016, pp. 83-92.
European Search Report for European Patent Application No. 24155337.9, dated Jul. 2, 2024, 7 pages.
European Search Report for European Patent Application No. 24156842.7, dated Jun. 25, 2024, 6 pages.
International Preliminary Report on Patentability for International Application No. PCT/US2022/053780, mailed Jul. 4, 2024, 9 pages.
International Preliminary Report on Patentability for International Application No. PCT/US2022/054413, mailed Jul. 25, 2024, 9 pages.
Office Action mailed Jun. 25, 2024 for Japanese Patent Application No. 2021-577408, filed on Aug. 8, 2020, 4 pages.

* cited by examiner

EPHEMERAL ARTIFICIAL REALITY EXPERIENCES

TECHNICAL FIELD

This disclosure generally relates to managing applications in artificial reality (AR) environments.

BACKGROUND

Artificial reality is a form of reality that has been adjusted in some manner before presentation to a user, which may include, e.g., an augmented reality, a virtual reality, a mixed reality, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A traditional method of managing applications on a user device (such as a virtual reality or artificial reality headset) is to download an application, install the application on a hard drive, and execute the application when the user desires to use it. For example, the user may access an application store to locate and identify the application they would desire to use, download, and install the application. That is, the user would be required to actively seek out the desired application. This process may increase the friction that detracts from a user's artificial reality experience.

SUMMARY OF PARTICULAR EMBODIMENTS

In particular embodiments, an artificial reality (AR) system may be able to execute native applications on an AR operating system such that a user can experience instant interaction with the application via an AR interface. The interaction with the application may be based on a "introductory" and only partially downloaded and installed version of the application that allows the user to experience the application, without fully downloading and installing on the user's device. As the user continues to use and experience the application, the AR operating system can progressively download and install the native application to allow the user to "delve deeper" into the experience offered by the application. That is, the user can begin to experience and engage with the application, and continue to experience and engage with the application without having to detract from the immersive AR experience.

In particular embodiments, one or more computing systems may instruct sensors on an AR headset to capture sensor data of a real-world environment. The one or more computing systems may discover, based on the sensor data, a 3D location at which a native application configured to run natively on the operating system is downloadable. The one or more computing systems may generate and display a virtual object to represent the native application at the 3D location. The one or more computing systems may, in response to detecting a user of the AR system interacting with the virtual object, download a first executable portion of the native application. The one or more computing systems may execute the first executable portion within a sandbox process executing on the operating system, where the first sandbox process may have a predetermined set of access permissions. The one or more computing systems may progressively download a remaining executable portion of the native application while the user is interacting with the executed first executable portion of the native application. The one or more computing systems may, in response to a determination that the native application is completely downloaded, install the native application on the operating system.

Certain technical challenges exist for managing applications in AR environments. One technical challenge may include ensuring user privacy is not breached by downloading, installing, and executing applications without the user's consent. The solution presented by the embodiments disclosed herein to address this challenge may be to progressively download and install an application, but only execute the full application once the user has granted the application the requisite permissions. Another technical challenge may include determining an appropriate method of presenting application experiences to the user. The solution presented by the embodiments disclosed herein to address this challenge may be to determine where a glint or virtual object corresponding to an application appears based on the user's proximity to objects and locations in the real-world environment. Certain embodiments disclosed herein may provide one or more technical advantages. A technical advantage of the embodiments may include allowing the user to immerse themselves within the AR experience and only breaking this immersion to grant the application permissions once the user has decided to commit to the application. Another technical advantage of the embodiments may include allowing the user to tailor the applications presented to them by basing the appearance of the applications on user settings and preferences. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, an artificial reality (AR) system (e.g., an operating system) may be able to execute native applications on an AR operating system such that a user can experience instant interaction with the application via an AR interface. The interaction with the application may be based on a "introductory," partially downloaded and installed, or "light" version of the application that allows the user to experience the application, without fully downloading and installing on the user's device. As the user continues to use and experience the application, the AR operating system can progressively download and install the native application to allow the user to "delve deeper" into the experience offered by the application. That is, the user can begin to experience and engage with the application, and continue to experience and engage with the application without having to detract from the immersive AR experience. Although this disclosure describes managing applications in AR environments in a particular manner, this disclosure contemplates managing applications in AR environments in any suitable manner.

Figure 1A:
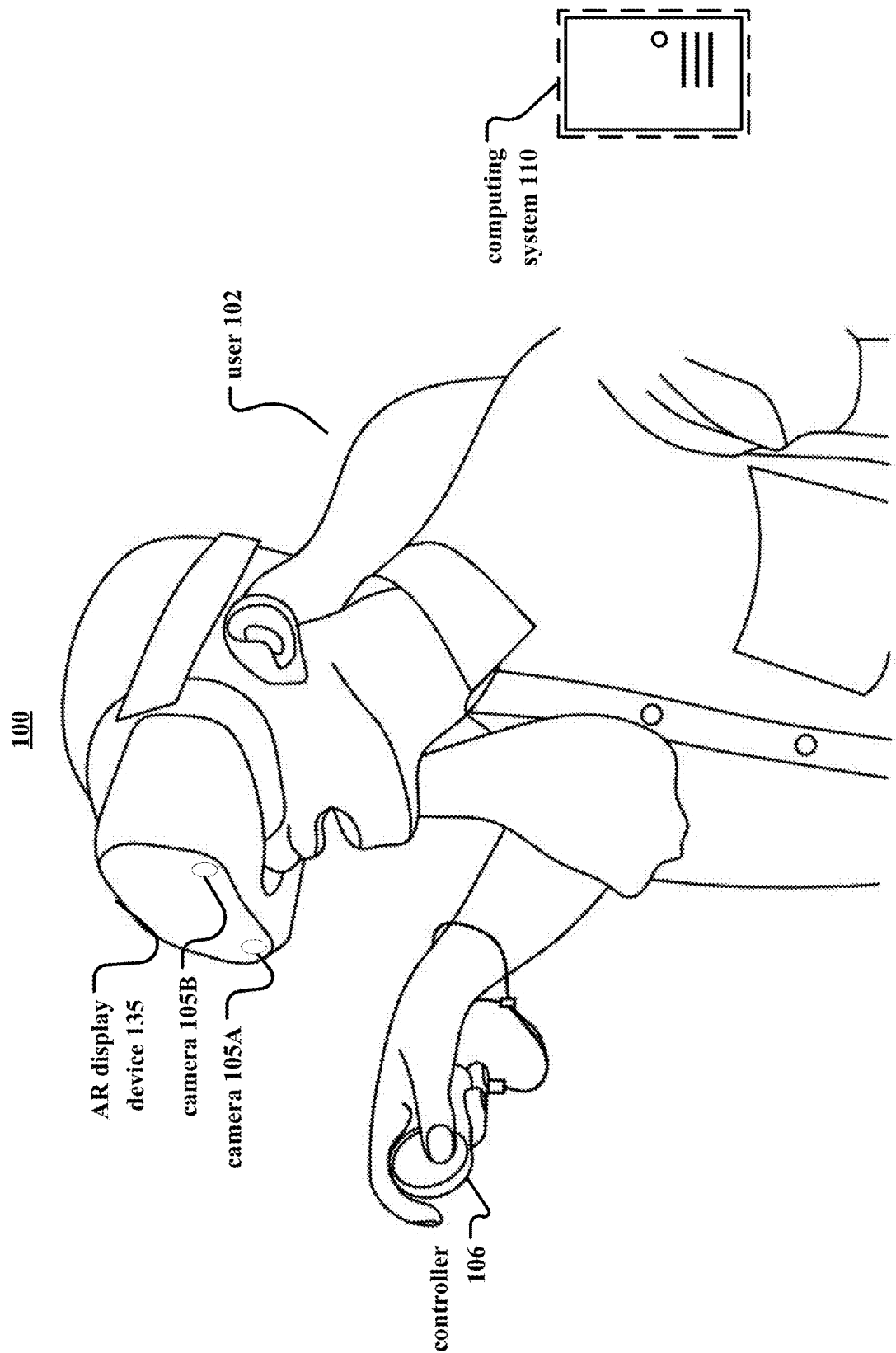
FIG. 1A illustrates an example artificial reality system worn by a user.

FIG. 1A illustrates an example of an artificial reality system 100 worn by a user 102. In particular embodiments, the artificial reality system 100 may comprise a head-mounted AR display device 135, a controller 106, and one or more computing systems 110. The AR display device 135 may be worn over the user's eyes and provide visual content to the user 102 through internal displays (not shown). The AR display device 135 may have two separate internal displays, one for each eye of the user 102 (single display devices are also possible). In particular embodiments, the AR display device 135 may comprise one or more external-facing cameras, such as the two forward-facing cameras 105A and 105B, which can capture images and videos of the real-world environment. As illustrated in FIG. 1A, the AR display device 135 may completely cover the user's field of view. By being the exclusive provider of visual information to the user 102, the AR display device 135 achieves the goal of providing an immersive artificial-reality experience. One consequence of this, however, is that the user 102 may not be able to see the physical (real-world) environment surrounding the user 102, as their vision is shielded by the AR display device 135. As such, the passthrough feature described herein may be technically advantageous for providing the user with real-time visual information about their physical surroundings.

Figure 1B:
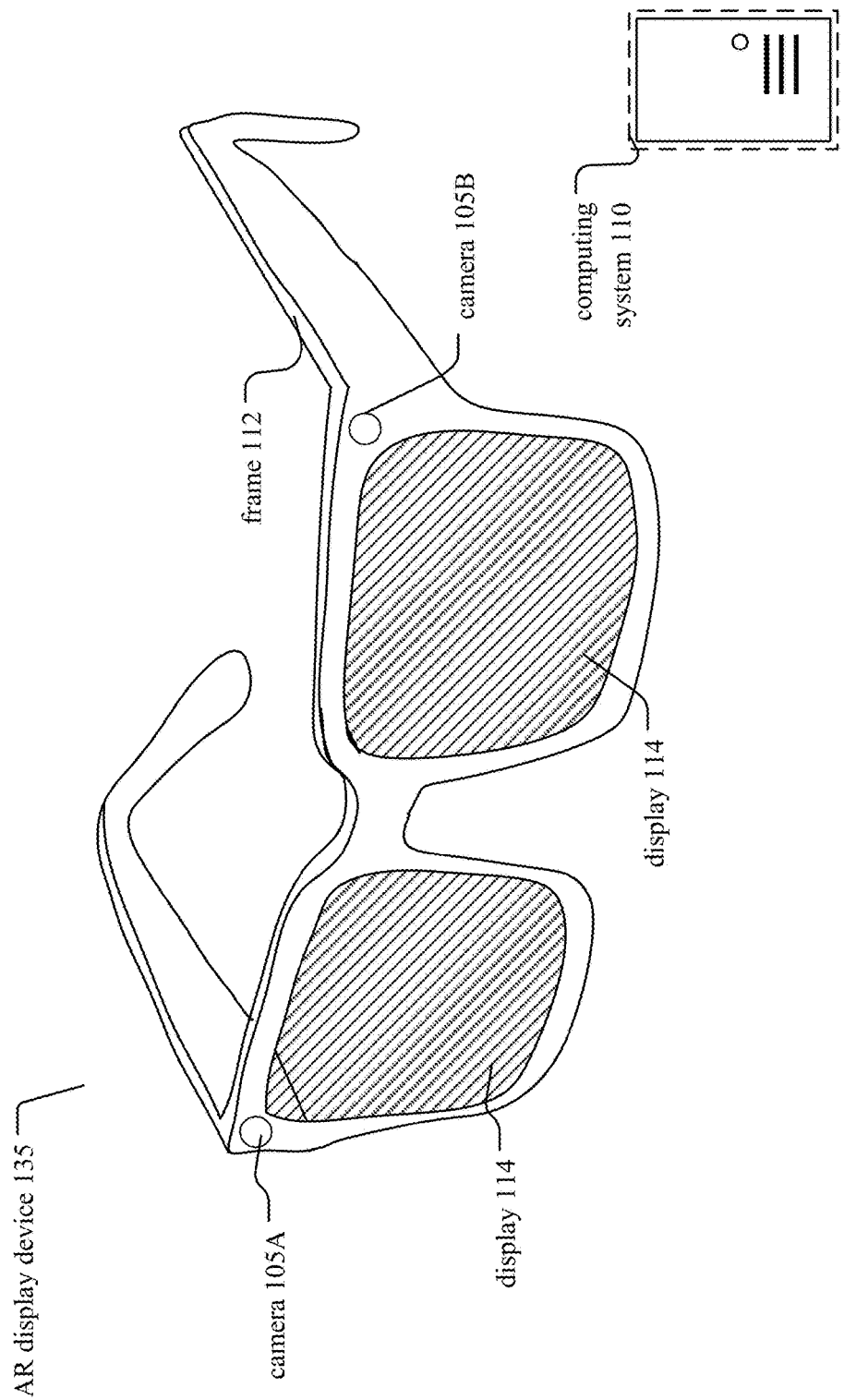
FIG. 1B illustrates an example artificial reality system.

In particular embodiments, the AR system 100 may instruct sensors on an AR headset to capture sensor data of a real-world environment 150. FIG. 1B illustrates an example artificial reality system 101. The artificial reality system 101 may include a head-mounted display AR display device 135 (e.g., AR glasses) comprising a frame 112, one or more displays 114, and one or more computing systems 110. The AR display device 135 may be worn over the user's eyes (e.g., like eyeglasses) and provide visual content to a user 102 (not shown) through displays 114. The displays 114 may be transparent or translucent allowing a user wearing the AR display device 135 to look through the displays 114 to see the real-world environment and displaying visual artificial reality content to the user at the same time. The AR display device 135 may include an audio device that may provide audio artificial reality content to users. The AR display device 135 may include one or more external-facing cameras, such as the two forward-facing cameras 105A and 105B, which can capture images and videos of the real-world environment. The AR display device 135 may include an eye tracking system to track the vergence movement of the user wearing the AR display device 135. The artificial reality system 101 may further include a controller 106 (not shown) comprising a trackpad and one or more buttons. The controller 106 may receive inputs from users and relay the inputs to the computing system 110. The controller 106 may also provide haptic feedback to users. The computing system 110 may be connected to the AR display device 135 and the controller through cables or wireless connections. The computing system 110 may control the AR display device 135 and the controller to provide the artificial reality content to and receive inputs from users. The computing system 110 may be a standalone host computer system, an on-board computer system integrated with the AR display device 135, a mobile computing device, or any other hardware platform capable of providing artificial reality content to and receiving inputs from users. Although this disclosure describes instructing sensors on an AR headset to capture sensor data of a real-world environment in a particular manner, this disclosure contemplates capturing data in any suitable manner.

Figure 2:
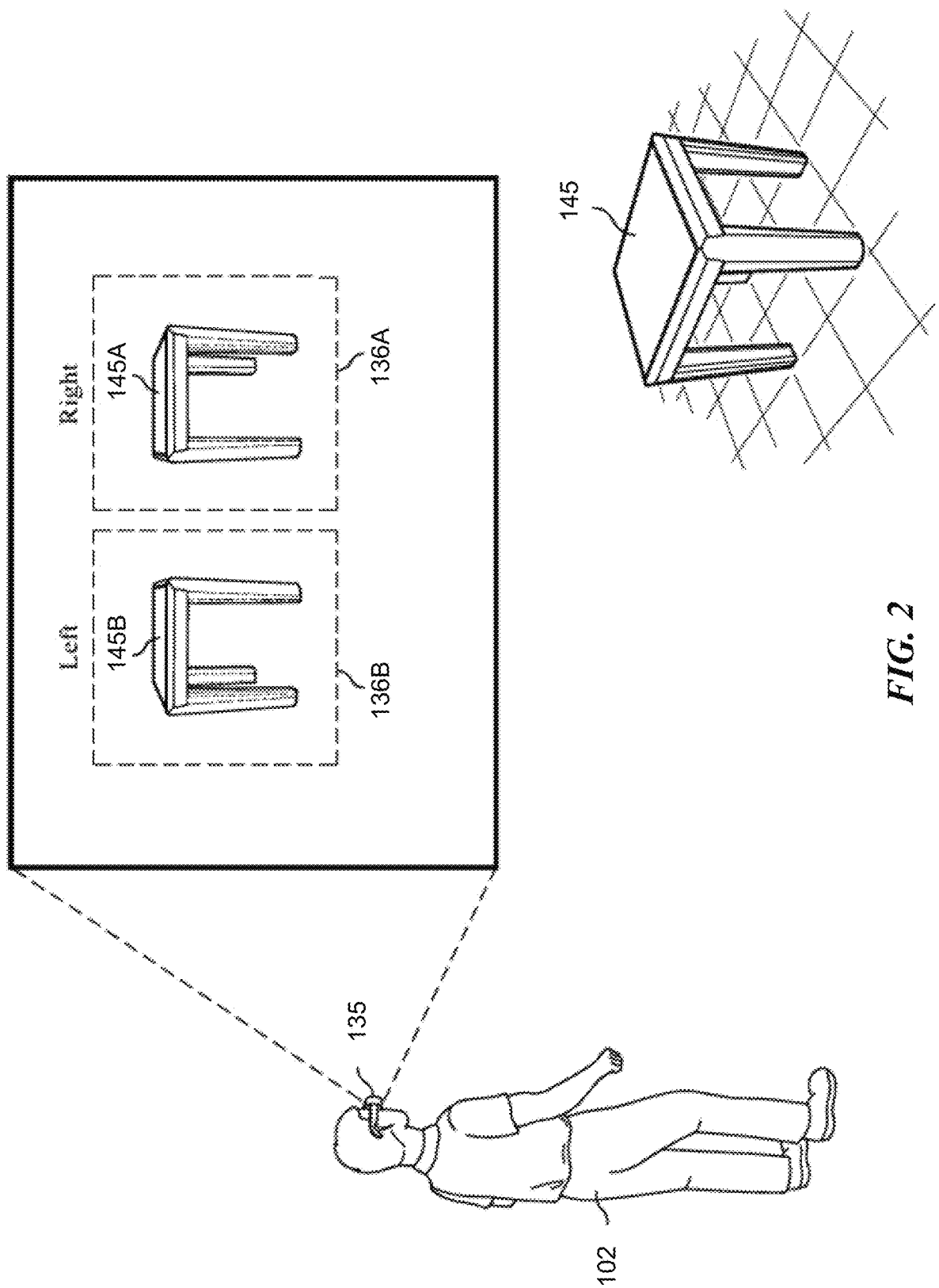
FIG. 2 illustrates an example of a passthrough feature of an artificial reality system.

FIG. 2 illustrates an example of the passthrough feature of an artificial reality system 100. A user 102 may be wearing a AR display device 135, immersed within an artificial reality environment. A real-world object 145 is in the physical environment surrounding the user 102. However, due to the AR display device 135 blocking the vision of the user 102, the user 102 is unable to directly see the real-world object 145. To help the user perceive their physical surroundings while wearing the AR display device 135, the passthrough feature captures information about the physical environment using, for example, one or more cameras 105 such as external-facing cameras 105A-B. The captured information may then be re-projected to the user 102 based on their viewpoints. In particular embodiments where the AR display device 135 has a right display 136A for the user's right eye and a left display 136B for the user's left eye, the artificial reality system 100 may individually render (1) a re-projected view 145A of the physical environment for the right display 136A based on a viewpoint of the user's right eye and (2) a re-projected view 145B of the physical environment for the left display 136B based on a viewpoint of the user's left eye.

Referring again to FIG. 1A, the AR display device 135 may have external-facing cameras, such as the two forward-facing cameras 105A and 105B shown in FIG. 1A. While only two forward-facing cameras 105A-B are shown, the AR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the AR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, the artificial reality system 100 could use triangulation techniques to compute the depth of the observed feature. For example, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., x-y-z position and r-p-y orientation) of the AR display device 135 within the environment may be needed. For example, in order to render the appropriate display for the user 102 while he is moving about in a augmented environment, the artificial reality system 100 may need to determine his position and orientation at any moment. Based on the pose of the AR display device, the artificial reality system 100 may further determine the viewpoint of either of the cameras 105A and 105B or either of the user's eyes. In particular embodiments, the AR display device 135 may be equipped with inertial-measurement units ("IMU"). The data generated by the IMU, along with the stereo imagery captured by the external-facing cameras 105A-B, allow the artificial reality system 100 to compute the pose of the AR display device 135 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the AR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the artificial reality system 100 may be able to capture an image of the predetermined pattern on the controller. Based on the observed orientation of those patterns, the system may compute the controller's position and orientation relative to the sensor or camera.

The artificial reality system 100 may further include one or more computing systems 110. The one or more computing systems 110 may be a stand-alone unit that is physically separate from the AR display device 135 or the computer system 110 may be integrated with the AR display device 135. In embodiments where the one or more computing systems 110 is a separate unit, the one or more computing systems 110 may be communicatively coupled to the AR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the AR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the AR display device 135). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 3:
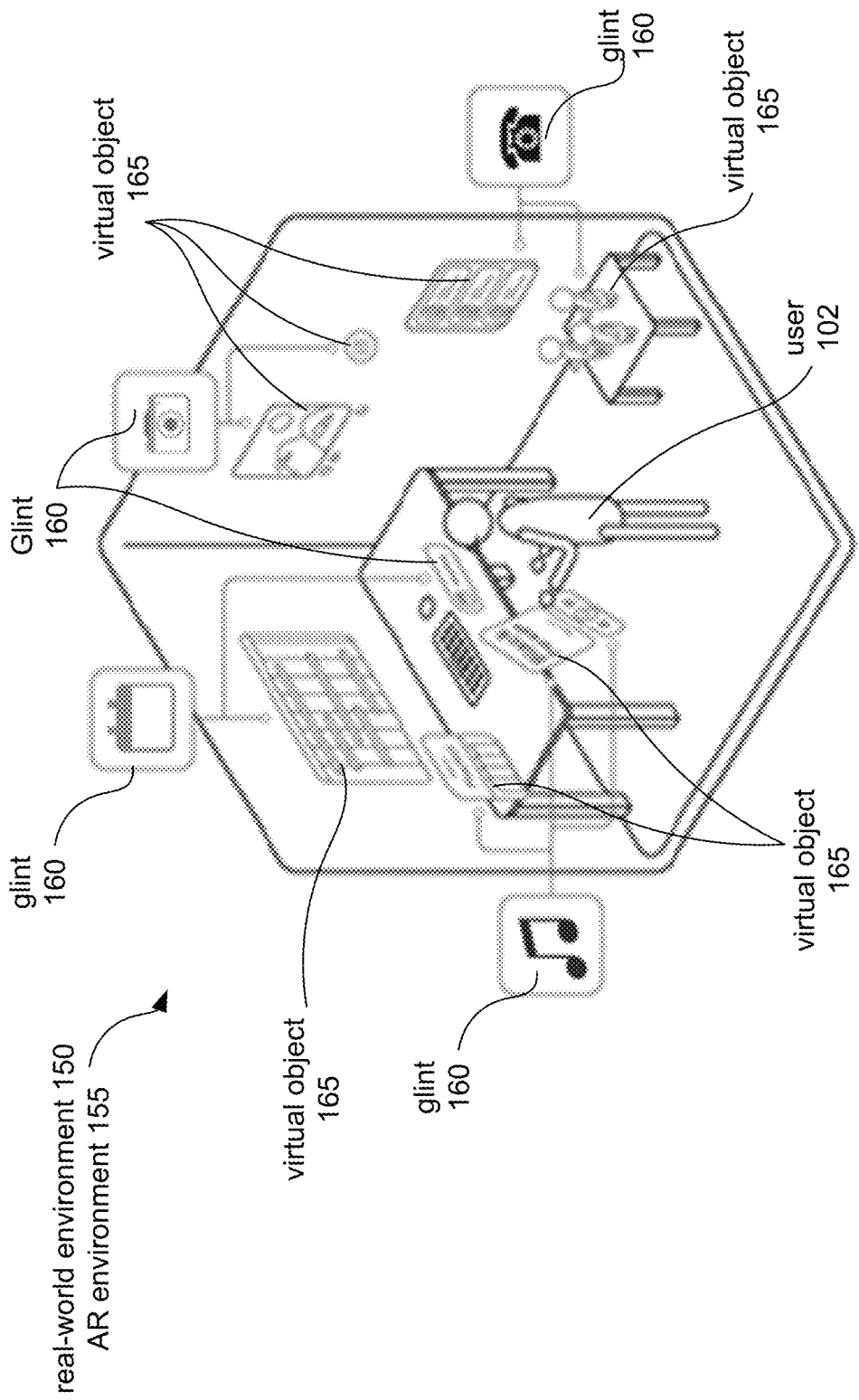
FIG. 3 illustrates an example of a user in an artificial reality environment.

In particular embodiments, the AR system 100 may generate and display a virtual object 165 to represent the native application at the 3D location (e.g., by generating and displaying the virtual object 165 at a 3D location within the AR environment 155). FIG. 3 illustrates an example of a user 102 in an AR environment 155. The AR environment 155 may correspond to a real-world environment 150. The real-world environment 150 may contain multiple objects such desks, chairs, tables, walls, etc. Virtual objects 165 in the AR environment 155 may correspond to one or more objects in the real-world environment 150. For example and not by way of limitation, a virtual object (such as a virtual calendar) in the AR environment 155 may appear on the real-world wall in the real-world environment 150, or other virtual objects 165 may appear on a real-world table.

In particular embodiments, the AR system 100 may discover, based on the sensor data, a 3D location at which a native application configured to run natively on the operating system may be downloadable. The 3D location may correspond to a location in the AR environment 155. The one or more virtual objects 165 may be provided within the AR environment 155 based on preferences or settings of the user 102. In particular embodiments, the user 102 may determine or identify (e.g., via user settings) their settings and preferences. As an example and not by way of limitation, if the user 102 indicates they enjoy trying new foods, one or more of the virtual objects presented to the user 102 may correspond to virtual menus outside a restaurant in the AR environment 155 when the user is in the vicinity of a restaurant in the corresponding real-world environment 150. As another example and not by way of limitation, if the user 102 connected their AR display device 135 to their social media accounts, and the user 102 is looking at their friend who's birthday is coming up, one or more virtual objects (such as the friend's online wish-list) may appear in the AR environment 155 next to the friend to encourage the user 102 to purchase a birthday gift for their friend. Alternatively, and as an example and not by way of limitation, if the user 102 indicates they do not enjoy shopping, the AR system 100 will not present the user 102 with virtual objects corresponding to shopping experiences.

Figure 4:
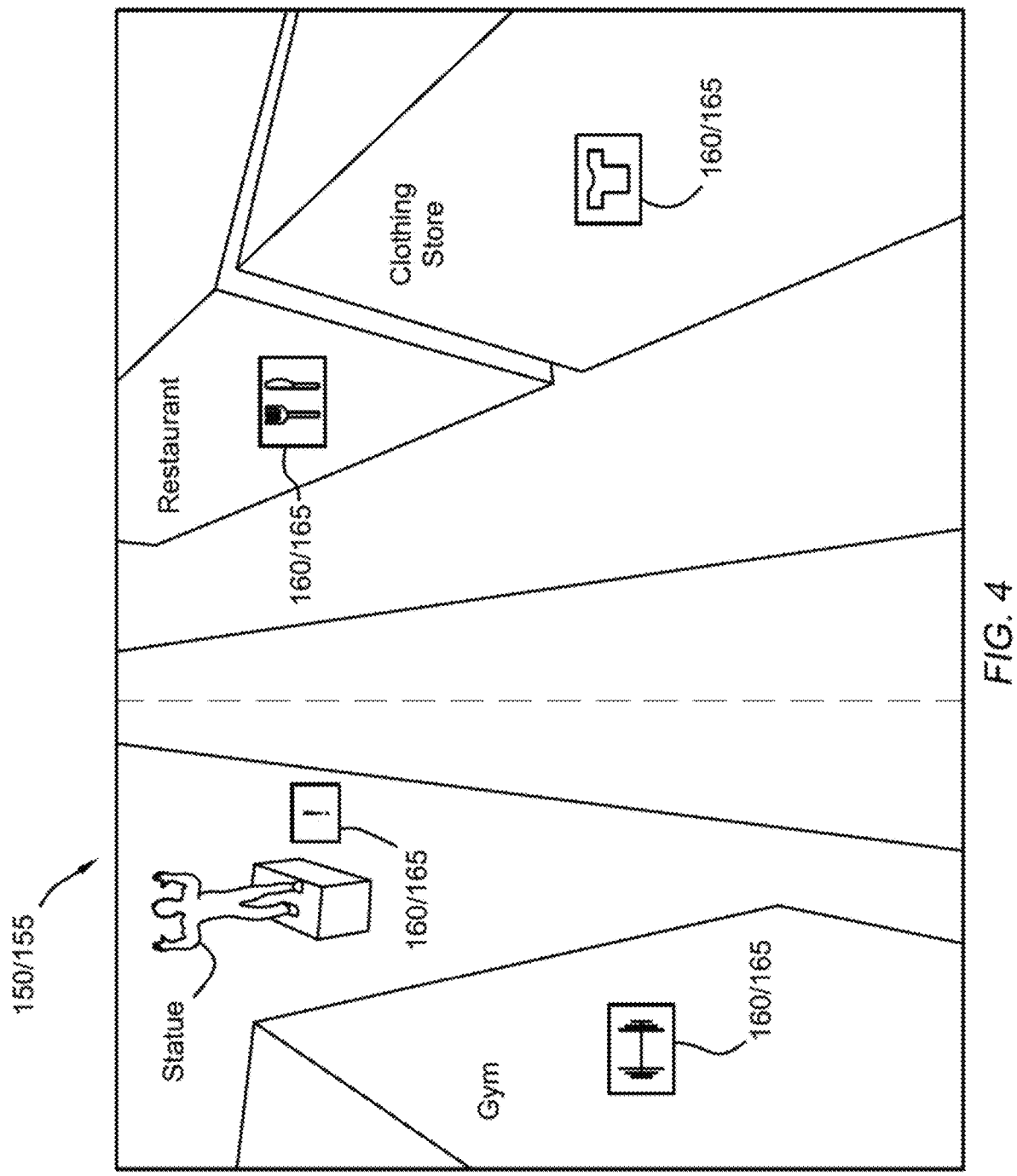
FIG. 4 illustrates an example perspective view of a user in an artificial reality environment.

A technical challenge may include determining an appropriate method of presenting application experiences to the user. The solution presented by the embodiments disclosed herein to address this challenge may be to determine where a glint 160 or virtual object 165 corresponding to an application appears based on the user's proximity to objects and locations in the real-world environment 150. FIG. 4 illustrates an example perspective view of a user 102 in an AR environment 155. As the user 102 travels down a street with buildings and sightseeing opportunities, the user 102 can experience. As the user walks by a gym, a virtual object 165 in the AR environment 155 may appear by the gym and correspond memberships offers, information about workout classes, and pricing. As the user walks by a clothing store, a virtual object 165 in the AR environment 155 may provide information about sales or clothes available at the store. As the user walks by a restaurant, a virtual object 165 in the AR environment 155 may provide information about the menu, or allow the user to order a dish. As the user walks by a statue, a virtual object 165 in the AR environment 155 may provide information about the individual being commemorated by the statue, provide links to more information about the individual, or provide a video discussing the individual. Although this disclosure describes discovering, based on the sensor data, a 3D location at which a native application configured to run natively on the operating system may be downloadable in a particular manner, this disclosure contemplates discovering a location at which a native application may be downloadable in any suitable manner.

Virtual objects corresponding to AR experiences may be customized based on the user 102's location, status, or other factor. As an example and not by way of limitation, if the user is in a shopping mall, the virtual objects that may appear in the AR environment 155 may correspond to shopping experiences, which may show the user sales, advertisements, or samples of products. As another example and not by way of limitation, if the user 102 is celebrating their birthday, virtual objects in the AR environment 155 may show the user activities or games the user 102 can experience as a fun event on their birthday. Thus, a technical advantage of the embodiments may include allowing the user to tailor the applications presented to them by basing the appearance of the applications on user settings and preferences.

In particular embodiments, the AR system 100 may, in response to detecting a user 102 of the AR system 100 interacting with the virtual object 165, download a first executable portion of the native application. The one or more virtual objects 165 may be represented in the AR environment 155 using one or more glints 160. The one or more glints 160 are virtual objects that the uservi 102 may interact with. The one or more glints 160 may be application icons that appear in the AR environment 155. The user 102 may indicate they would like to select an experience offered by the glint 160 by engaging with the glint 160 corresponding to the virtual object 165. As an example and not by way of limitation, the user may walk to or approach the glint 160 to indicate they would like to select the experience offered by the glint 160 (e.g., by detecting the user's motion toward the glint 160 or virtual object 165). As an example and not by way of limitation, the user may point to the glint 160 to indicate they would like to select the experience offered by the glint 160, e.g., by pointing to the glint 160 for a threshold amount of time (e.g., by detecting the controller 06 pointing at the glint 160 or virtual object 165 for 5 seconds). As an example and not by way of limitation, the user may stare at the glint 160 to indicate they would like to select the experience offered by the glint 160, e.g., by staring at the glint 160 for a threshold amount of time (e.g., by detecting an eye gaze at the glint 160 or virtual object 165 for 5 seconds). Although this disclosure describes generating and displaying a virtual object to represent the native application at the 3D location in a particular manner, this disclosure contemplates generating and displaying a virtual object in any suitable manner. Although this disclosure describes downloading a first executable portion of the native application in a particular manner, this disclosure contemplates downloading a portion of the native application in any suitable manner.

In particular embodiments, the AR system 100 may execute the first executable portion within a sandbox process executing on the AR operating system 100. The first sandbox process may have a predetermined set of access permissions. As an example and not by way of limitation, the user 102 may trigger an application experience that correlates to a small "introductory" portion of the application. That is, the virtual object 165 or glint 160 corresponding to the application can offer an ephemeral experience that allows the user 102 to explore the AR environment, settings, or other feature offered by the application. Thus, the user 102 can get a preview, glance, or "test run" of the experience offered by the application, without having to install the full application onto a hard drive and launch it in response to a user command. For example, a glint 160 corresponding to an all-natural materials clothing store may display a an introductory experience such as a promotional video detailing how the clothing store manufactures their clothing in an environmentally conscious manner. Although this disclosure describes executing the first executable portion within a sandbox process executing on the operating system in a particular manner, this disclosure contemplates executing the first executable portion in any suitable manner.

In particular embodiments, the AR system 100 may progressively download a remaining executable portion of the native application while the user 102 is interacting with the executed first executable portion of the native application. That is, the user 102 can experience instant interaction with an application through an AR interface by "entering" an AR experience that is native within the AR platform. After the user can be "invited" into an AR experience of an application accessible through the AR interface and while the user continues to engage with the native application, the operating system may progressively download and install the native application to allow the user 102 to "delve deeper" into the native application. While the user 102 continues to interact with the partially downloaded and installed application, the operating system can progressively download and install the full application. As an example and not by way of limitation, as the user views the all-natural materials clothing store's promotional video detailing how the clothing store manufactures their clothing in an environmentally conscious manner, the user can continue to peruse the all-natural materials clothing store's selection of clothing. Thus, the user can continue to experience and engage with the native application by diving deeper into the application with less "friction" (i.e., breaks from user immersion) detracting from the AR experience. Although this disclosure describes progressively downloading a remaining executable portion of the native application in a particular manner, this disclosure contemplates progressively downloading a remaining executable portion of the native application in any suitable manner.

A technical challenge may include ensuring user privacy is not breached by downloading, installing, and executing applications without the user's consent. The solution presented by the embodiments disclosed herein to address this challenge may be to progressively download and install an application, but only execute the full application once the user has granted the application the requisite permissions. Traditionally, installing a native application would prompt the operating system to ask the user 102 to grant permissions (e.g., to use camera, microphone, GPS, motion sensors, etc. features of the user device). Such requests may be intrusive to AR immersion and add "friction" to the user's AR experience. To reduce this "friction," the user 102 may approach or interact with the virtual object 165 or glint 160 to initially and immediately access a starting experience for the application. As stated earlier, this can be achieved by downloading and installing a partial, incomplete, or otherwise small portion of the application to allow immediate access to the application. However, even though applications may operate natively on the operating system, the user's security is still paramount. Thus, while native applications may execute on the AR platform/operating system—even partially—the user 102 may set permissions that limit what applications may run. That is, the user may set the implicit permissions that allow an application to execute to a limited extent, such that the application does not have access to the user's camera, microphone, GPS, motion sensors, etc. The partially downloaded and installed application can then launch in a secure sandbox process that requires only minimal permissions, which can be set by the user 102 to ensure user security. Thus, the user 102 may begin to enjoy the AR experience associated with the application without the intrusion of the operating system breaking the user's immersion by requesting the user 102 to grant the application certain permissions. Then, while the user 102 continues to interact with the partially downloaded and installed application, the operating system may progressively download and install the full application. However, to grow into the full user experience, only then may the operating system ask the user 102 for all the necessary permissions to execute the full application. Thus, applications will have to receive explicit permission from the user 102 to fully execute on the operating system (e.g., applications will not have implicit access to run natively if the user's permissions do not allow them to). A technical advantage of the embodiments may include allowing the user to immerse themselves within the AR experience and only breaking this immersion to grant the application permissions once the user has decided to commit to the application.

In particular embodiments, the AR system 100 may, in response to a determination that the native application is completely downloaded, install the native application on the operating system. As an example and not by way of limitation, if the user 102 decides to purchase items from the all-natural materials clothing store, full application permissions may be required to connect the user's credit card to pay for the items and to fill in the user's home address for the shipping information. Although this disclosure describes installing the native application on the operating system in a particular manner, this disclosure contemplates installing the native application on the operating system in any suitable manner.

Figure 5:
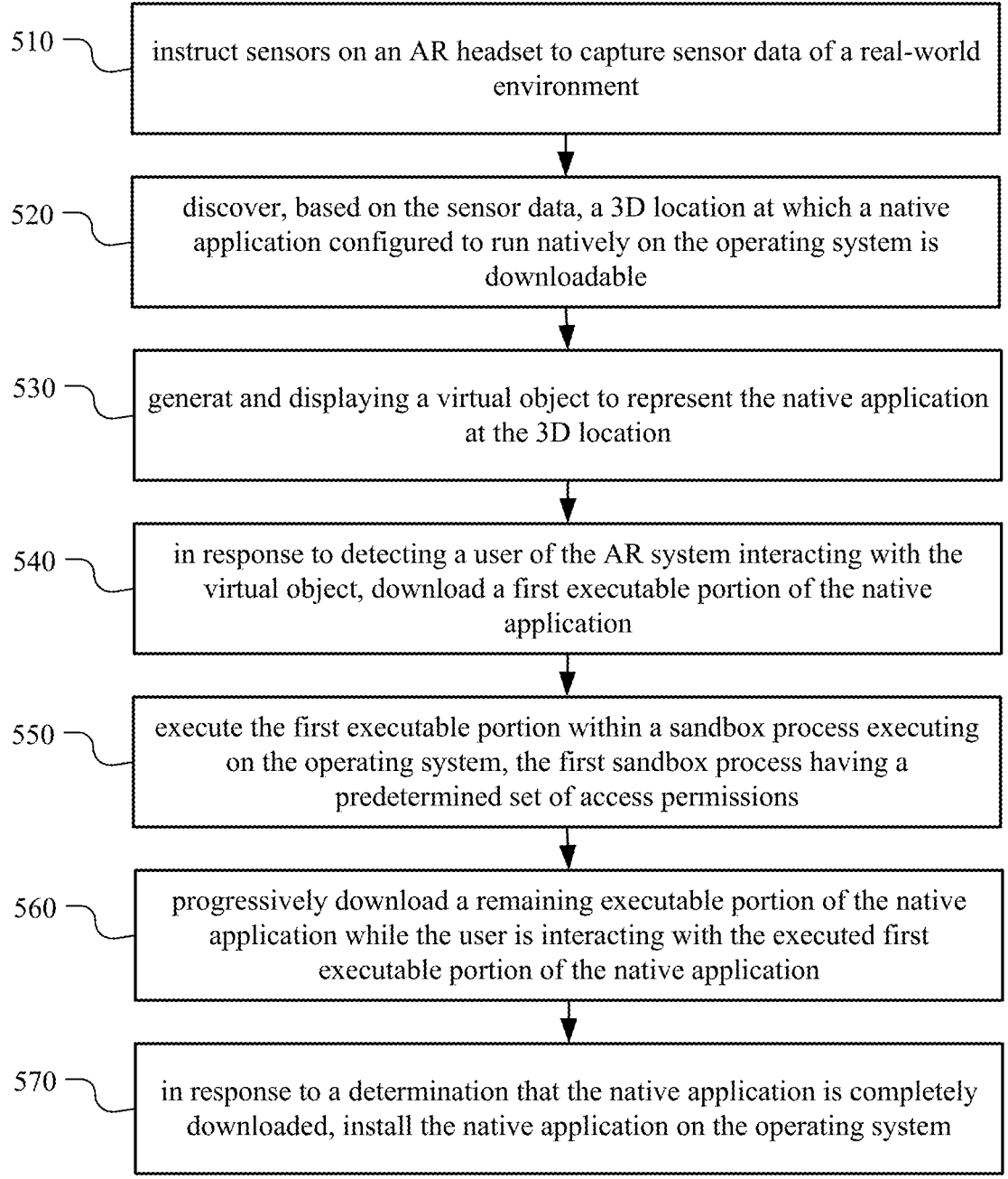
FIG. 5 illustrates an example method for managing applications in artificial reality environments.

FIG. 5 illustrates an example method 500 for managing applications in AR environments. The method may begin at step 510, where one or more computing systems may instruct sensors on an AR headset to capture sensor data of a real-world environment. At step 520, the one or more computing systems may discover, based on the sensor data, a 3D location at which a native application configured to run natively on the operating system is downloadable. At step 530, the one or more computing systems may generate and display a virtual object to represent the native application at the 3D location. At step 540, the one or more computing systems may, in response to detecting a user of the AR system interacting with the virtual object, download a first executable portion of the native application. At step 550, the one or more computing systems may execute the first executable portion within a sandbox process executing on the operating system. The first sandbox process may have a predetermined set of access permissions. At step 560, the one or more computing systems may progressively download a remaining executable portion of the native application while the user is interacting with the executed first executable portion of the native application. At step 570, the one or more computing systems may, in response to a determination that the native application is completely downloaded, install the native application on the operating system. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for managing applications in AR environments including the particular steps of the method of FIG. 5, this disclosure contemplates any suitable method for managing applications in AR environments including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
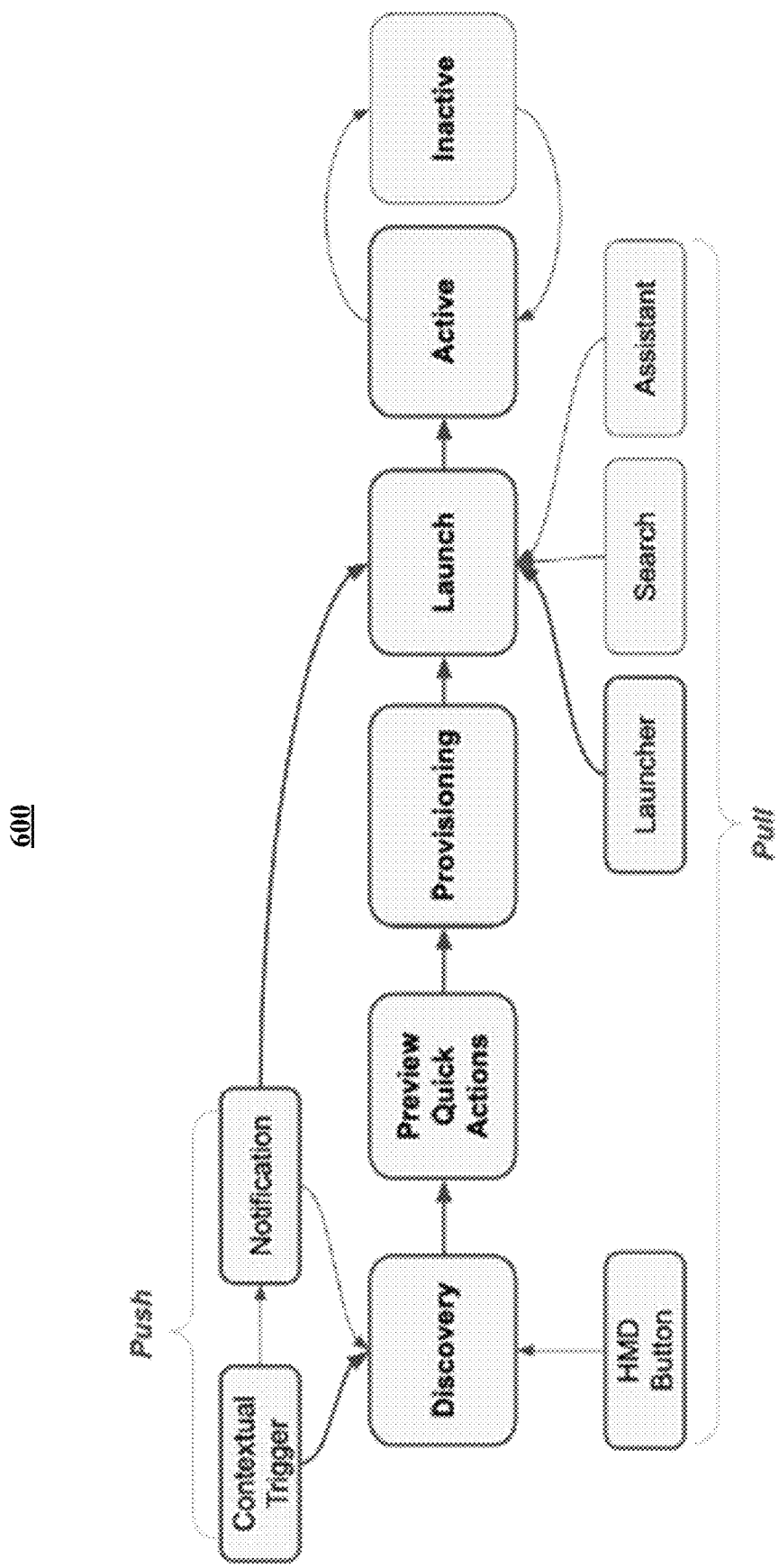
FIG. 6 illustrates an example view of an application lifecycle in artificial reality.

FIG. 6 illustrates an example view 600 of an application lifecycle in artificial reality. As instantaneous experiences are desired, the operating system may progressively download and install the full application. However, before fully launching the application (e.g., and as initiated by a contextual trigger, a notification, pressing a button on a head mounted display (HMD), or other form of discovery), the user may preview quick actions available to experience for the application. Additionally, the operating system may begin a provisioning process by progressively downloading and installing the full application, prior to a user launching the application. The application could then be launched in a variety ways, including via the device's launcher, via a search function, and via an assistant (e.g., a voice processing audio assistant system. Following a launch, the application may enter an active or an inactive state.

Figure 7:
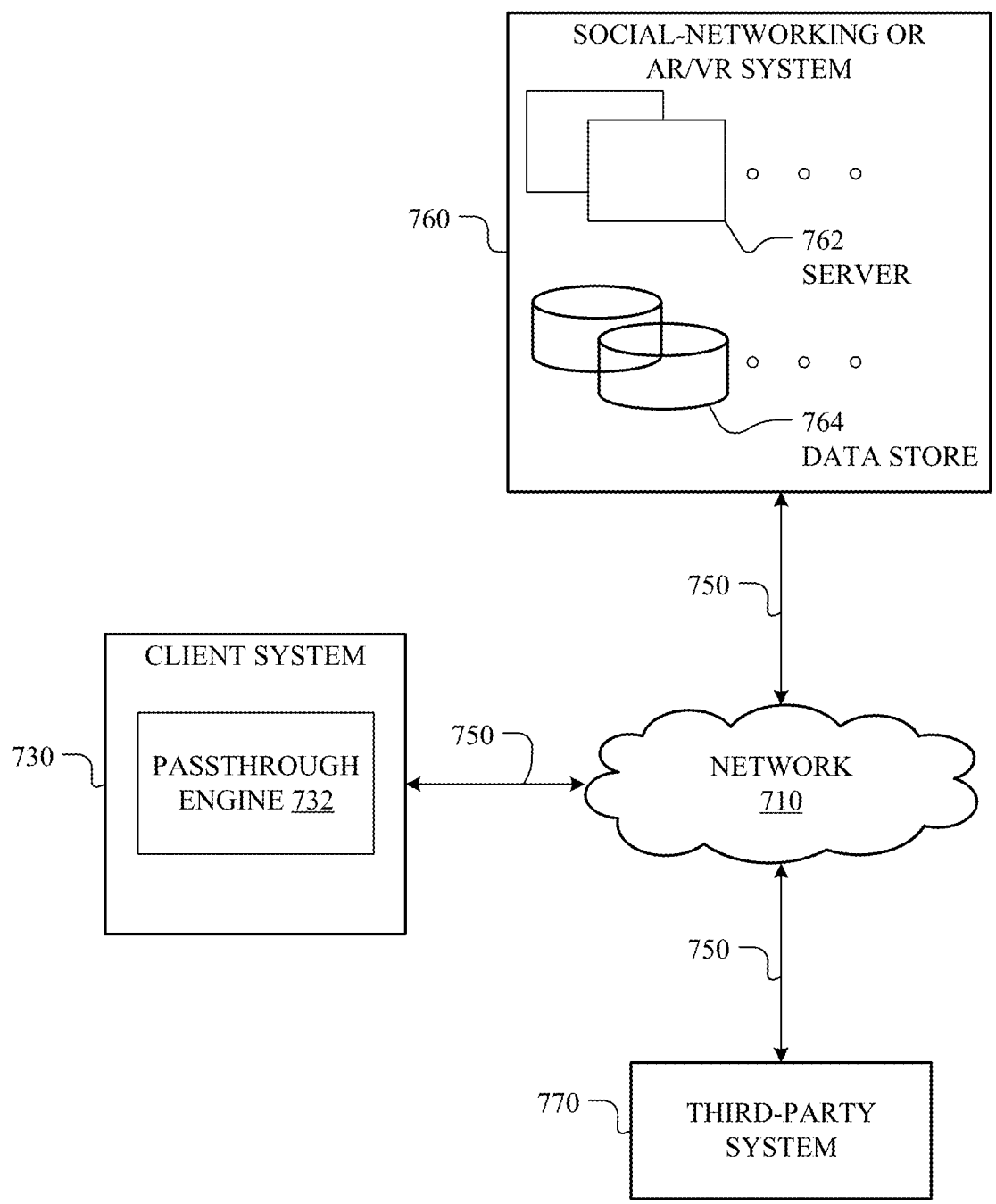
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, and may have one or more add-ons, plug-ins, or other extensions. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 760). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 760 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 760) or RSVP (e.g., through social-networking system 760) to an event associated with the advertisement. In addition or as an alternative, an advertisement may include social-networking-system content directed to the user. As an example and not by way of limitation, an advertisement may display information about a friend of the user within social-networking system 760 who has taken an action associated with the subject matter of the advertisement.

Figure 8:
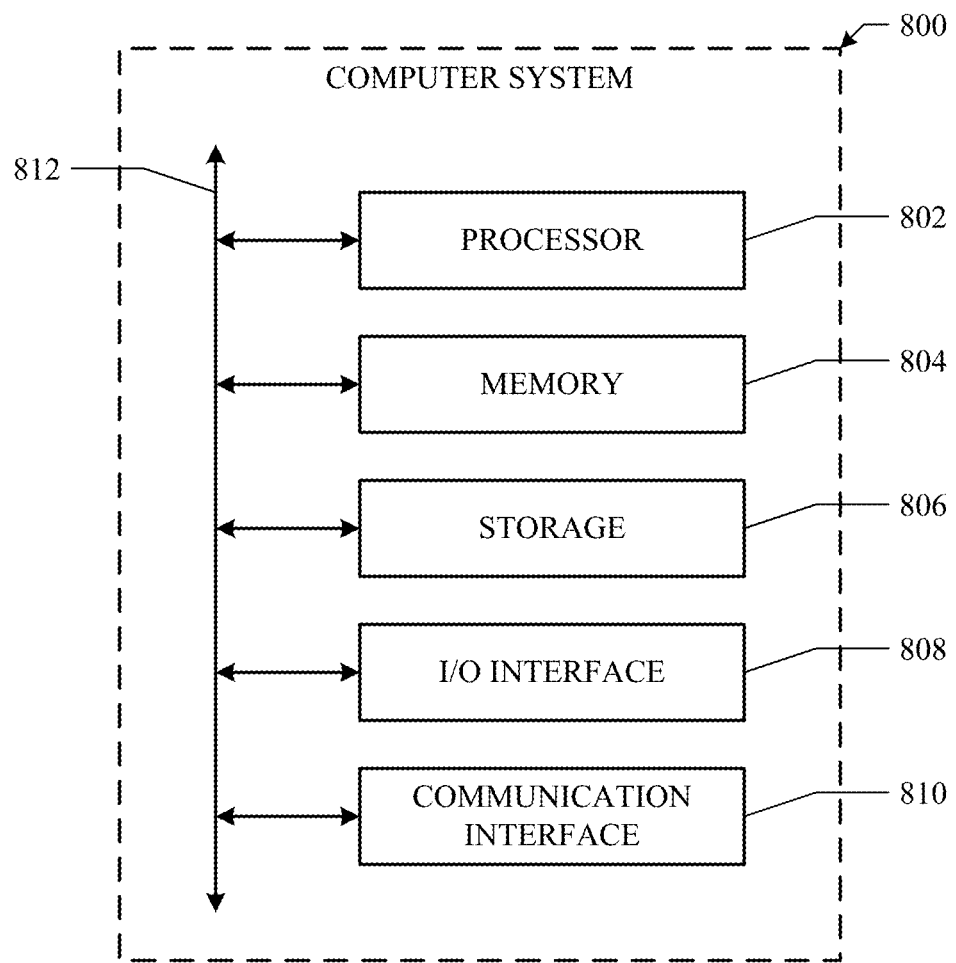
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an operating system of an artificial reality (AR) system:
    instructing sensors on an AR headset to capture sensor data of a real-world environment;
    discovering, based on the sensor data, a 3D location at which a native application configured to run natively on the operating system is downloadable, wherein the 3D location is determined based in part on a user's proximity to a real-world element associated with the native application;
    generating and displaying a virtual object to represent the native application at the 3D location;
    in response to detecting a user of the AR system interacting with the virtual object, downloading a first executable portion of the native application;
    executing the first executable portion within a sandbox process executing on the operating system, the sandbox process comprising a limited set of access permissions predefined by the user of the AR system, wherein the executing first executable portion is restricted by the limited set of access permissions;
    progressively downloading a remaining executable portion of the native application while the user is interacting with the executed first executable portion of the native application;
    in response to a determination that the native application is completely downloaded, installing the native application on the operating system; and
    launching the native application installed on the operating system, wherein the launched native application comprises a full set of access permissions, and the full set of access permissions permits greater access than the limited set of access permissions.

2. The method of claim 1, wherein the limited set of access permissions for the sandbox process are predefined by the user prior to downloading the first executable portion of the native application.

3. The method of claim 2, wherein detecting the user of the AR system interacting with the virtual object further comprises:
    detecting an eye gaze at the virtual object, wherein the eye gaze is detected for a threshold period of time.

4. The method of claim 1, wherein detecting the user of the AR system interacting with the virtual object further comprises:
    detecting the user pointing at the virtual object, wherein the user pointing is detected for a threshold period of time.

5. The method of claim 1, wherein detecting the user of the AR system interacting with the virtual object further comprises:
    detecting the user approaching the virtual object.

6. The method of claim 1, wherein the virtual object is offered based on user preferences.

7. The method of claim 6, wherein the user preferences are determined based on user-defined settings.

8. The method of claim 1, wherein the virtual object is a glint.

9. A system comprising:
    one or more processors; and
    one or more computer-readable non-transitory storage media coupled to one or more of the processors and comprising instructions operable when executed by one or more of the processors to cause the system to:
        instruct sensors on an artificial reality (AR) headset to capture sensor data of a real-world environment;
        discover, based on the sensor data, a 3D location at which a native application configured to run natively on the operating system is downloadable, wherein the 3D location is determined based in part on a user's proximity to a real-world element associated with the native application;
        generate and display a virtual object to represent the native application at the 3D location;
        in response to detecting a user of an AR system interacting with the virtual object, download a first executable portion of the native application;
        execute the first executable portion within a sandbox process executing on the operating system, the sandbox process comprising a limited set of access permissions predefined by the user of the AR system, wherein the executing first executable portion is restricted by the limited set of access permissions;
        progressively download a remaining executable portion of the native application while the user is interacting with the executed first executable portion of the native application;
    in response to a determination that the native application is completely downloaded, install the native application on the operating system; and
    launching the native application installed on the operating system, wherein the launched native application comprises a full set of access permissions, and the full set of access permissions permits greater access than the limited set of access permissions.

10. The system of claim 9, wherein the limited set of access permissions for the sandbox process are predefined by the user prior to downloading the first executable portion of the native application.

11. The system of claim 10, wherein detecting the user of the AR system interacting with the virtual object further comprises:
    detecting an eye gaze at the virtual object.

12. The system of claim 11, wherein the eye gaze is detected for a threshold period of time.

13. The system of claim 9, wherein detecting the user of the AR system interacting with the virtual object further comprises:
detecting the user pointing at the virtual object.

14. The system of claim 13, wherein the user pointing is detected for a threshold period of time.

15. The system of claim 9, wherein detecting the user of the AR system interacting with the virtual object further comprises:
detecting the user approaching the virtual object.

16. The system of claim 9, wherein the virtual object is offered based on user preferences.

17. The system of claim 16, wherein the user preferences are determined based on user-defined settings.

18. The method of claim 16, further comprising:
prompting the user, prior to launching the native application, for permissions to launch the full application with the full set of access permissions.

19. The method of claim 18, wherein,
the first executable portion is implicitly granted the limited set of access permissions via executing the first executable portion within the sandbox process, and
the user is not prompted for additional access permissions beyond the limited set of access permissions prior to executing first executable portion within the sandbox process.

20. One or more computer-readable non-transitory storage media embodying software that is operable when executed to:

instruct sensors on an artificial reality (AR) headset to capture sensor data of a real-world environment;
discover, based on the sensor data, a 3D location at which a native application configured to run natively on the operating system is downloadable, wherein the 3D location is determined based in part on a user's proximity to a real-world element associated with the native application;
generate and display a virtual object to represent the native application at the 3D location;
in response to detecting a user of an AR system interacting with the virtual object, download a first executable portion of the native application;
execute the first executable portion within a sandbox process executing on the operating system, the sandbox process comprising a limited set of access permissions predefined by the user of the AR system, wherein the executing first executable portion is restricted by the limited set of access permissions;
progressively download a remaining executable portion of the native application while the user is interacting with the executed first executable portion of the native application;
in response to a determination that the native application is completely downloaded, install the native application on the operating system; and
launching the native application installed on the operating system, wherein the launched native application comprises a full set of access permissions, and the full set of access permissions permits greater access than the limited set of access permissions.

* * * * *